Feb. 3, 1931.    C. W. CAREY    1,791,349
LIQUID DISPENSING MACHINE
Filed April 2, 1927    2 Sheets-Sheet 1
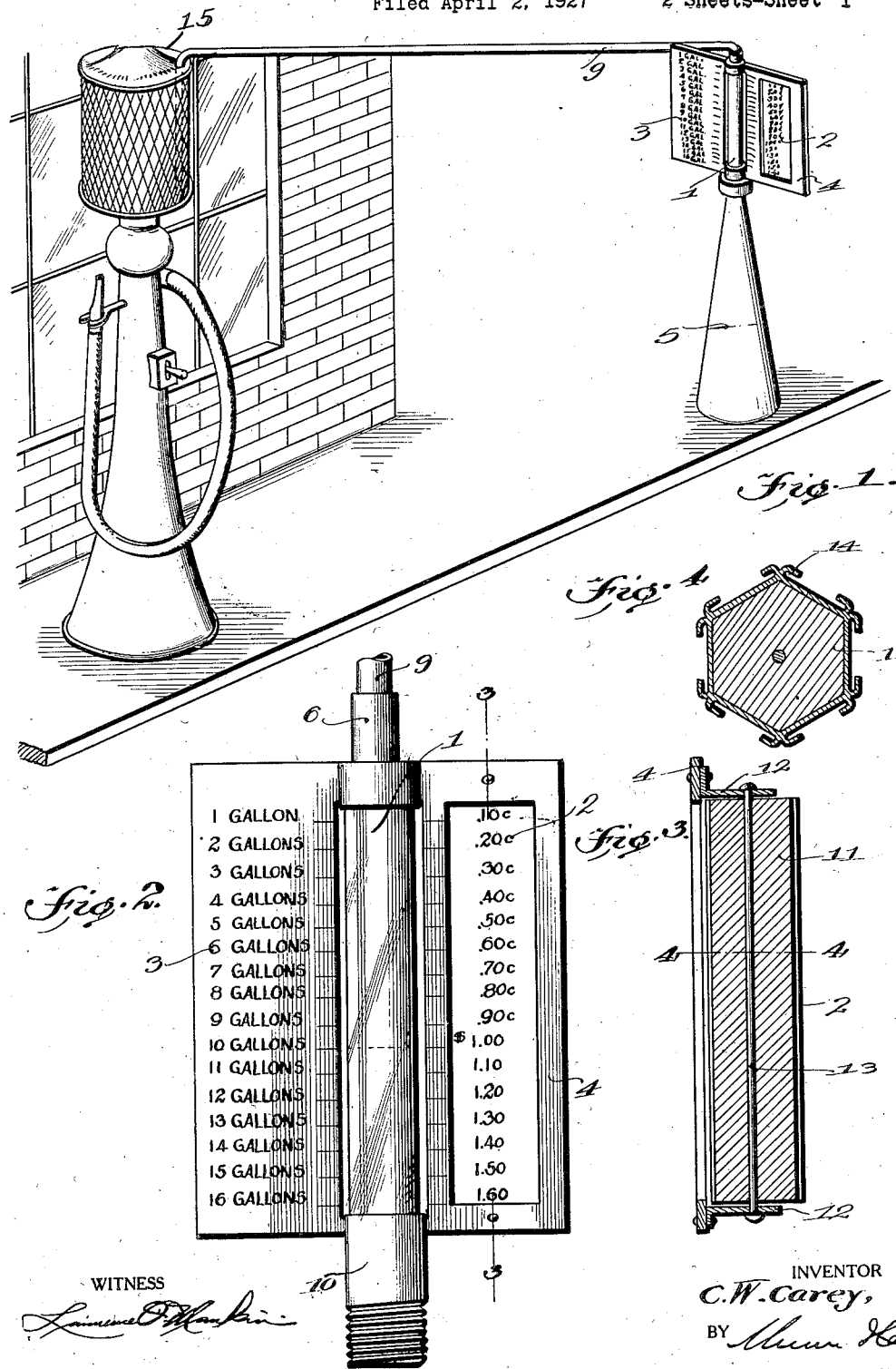

Feb. 3, 1931. C. W. CAREY 1,791,349
LIQUID DISPENSING MACHINE
Filed April 2, 1927. 2 Sheets-Sheet 2
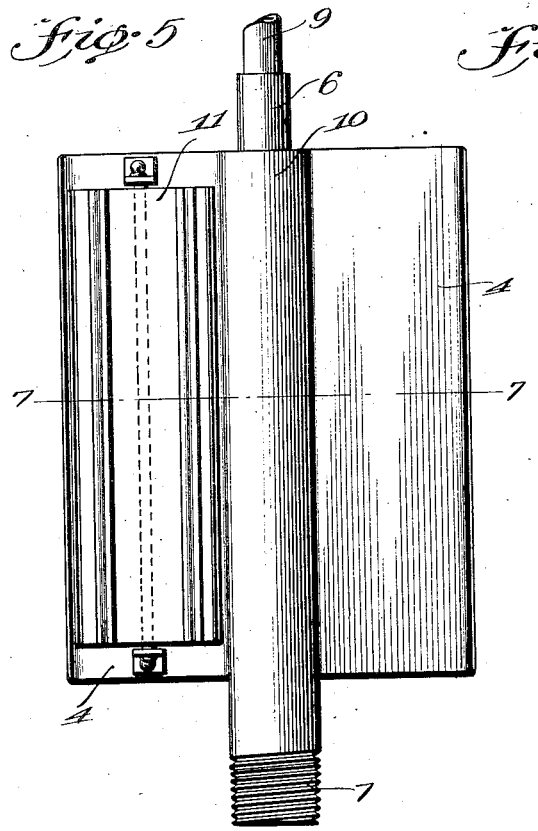
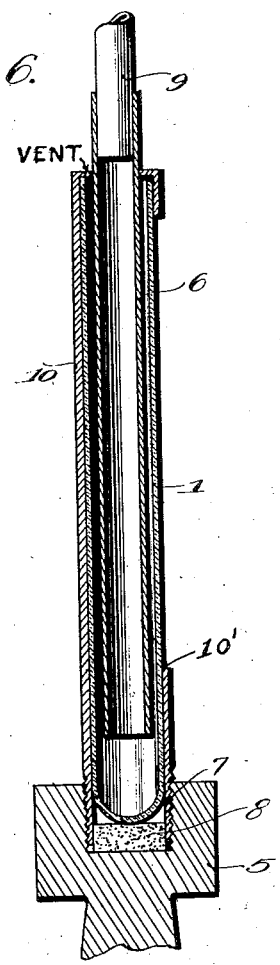
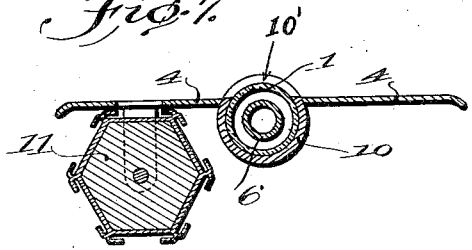
INVENTOR
C. W. Carey,
ATTORNEYS Patented Feb. 3, 1931

1,791,349

UNITED STATES PATENT OFFICE

CHARLES W. CAREY, OF WILBUR, KENTUCKY

LIQUID-DISPENSING MACHINE

Application filed April 2, 1927. Serial No. 180,532.

The invention relates to a device adapted to be attached to machines for dispensing liquids, and more specifically relates to a device to indicate the amount of liquid withdrawn from the container; more particularly the invention pertains to a device for readily showing the amount of liquid so withdrawn, and the cost of the same to the purchaser.

The invention is applicable especially to the pumps employed in gasoline filling stations, providing a ready means for the purchaser of the gasoline to ascertain the amount of liquid withdrawn, with a corresponding price of the quantity.
These means consist of a scale graduated in the amount of liquid withdrawn, each graduation being placed opposite the current price for the given quantity. Price variations from day to day may be taken care of by making the price scale removable and also by providing polygonal supports for the said scale, different scales being mounted upon each side of the said polygonal support.

The invention is illustrated in the accompanying drawings in which:

Figure 1 represents a device mounted in operative position with respect to a gasoline pump of the usual construction, Figure 2 shows a view of the device itself removed from the support, and illustrating the scale of quantity and scale of price provided for said device, Figure 3 is a view on the line 3—3 of Figure 2 showing a means of mounting the price scale and its carrier, Figure 4 is a section taken on the line 4—4 of Figure 3, showing the general shape of the support for the price scales and the means holding the scales upon said support, Figure 5 is a rear view of the device showing the mounting of the price scale support, Figure 6 is a longitudinal section through the middle of the device, showing the construction of the interior of the unit and Figure 7 is a cross section on the line 7—7 of Figure 5.

Referring to the drawings it will be seen that the device is comprised essentially of a tube 1 suitably mounted in a metal holder 10 which acts as a supporting member for the tube 1 and also protects the tube against breakage. Within the tube 1, which tube is of transparent material insoluble in the liquid employed, is inserted a tube 6 which reaches almost to the bottom of the tube 1. This tube 1 may conveniently be formed of glass. The holder 10 is provided with a vertically extending longitudinal sight opening 10' so that the glass or transparent tube may be viewed. Reading from the pump to the device is the pipe 9 which is inserted into the tube 6 a comparatively short distance from the top thereof. Secured in any convenient way to the member 10 are the wings 4 usually of metal, this member 4 carrying the scale 3 to indicate the quantity of liquid withdrawn and also the scale 2 showing the price of each unit of the quantity of the material. The elements of these scales are clearly shown in the drawings in Figures 1 and 2. The wings 4 may be made integral with support 10, or they may be rigidly secured thereto in any convenient manner. The device is conveniently mounted on a support 5 as shown in Figure 1, the mounting being secured by convenient means such as threads 7 in the member 10, these threads coacting with threads in the support 5. At the bottom of the member 10 is usually provided a member 8, which serves as a packing holding the tube 1 out of contact with support 5, retaining the tube 1 in position and preventing the same from being broken by forcibly dropping against the support 5 or from sliding from the member 10. The member 11 is mounted on a support by any convenient means as shown in the drawings, which mounting is conveniently done by means of the rivet 13 extending through the brackets 12 secured to one of the wings 4. The scale 2 may be conveniently mounted upon this support 11, the support being shown in Figure 4 as being provided with lugs 14 between each pair of which the scale may be placed.

It will be seen that the member 10 is broken away, so a portion of the tube 1 may be rendered visible this being arranged so that the liquid level in the tube 1 may be readily compared with the scales adjacent the tube.

In the operation of the device, a colored liquid of any convenient kind is placed in the tube 1 until it is level corresponding to the one gallon mark on the scale when the dispensing chamber is filled with liquid. When the tank 15 is being filled, the liquid rising therein causes the displacement of air from the tank. As the air is displaced, air pressure is communicated to the transparent tube 1 by way of the pipe 9. This pressure acting on the colored liquid causes the latter to rise in the tube 1 to correspond to the height of the liquid contained in the tank 15. As the liquid is displaced within the tank 15, the colored liquid lowers in the transparent tube, accordingly. The price of the liquid so withdrawn is shown by the corresponding price value on the scale 2. The support 11 carrying the price scale may be mounted upon the rivet 13 so that the price variations may be retained by providing different scales for each face of the support 11 or rotating the proper scale into position.

It will thus be seen that the device provides a ready means for showing the amount of liquid withdrawn from the container, for instance pumps, together with the price thereof.

The description above is to be regarded as being illustrative only. Modifications of the device being permissible in obvious manner. The scope of the invention is defined by the following claim.

I claim:

In a liquid level indicating gauge, a pedestal having an interiorly threaded recess in its upper face, a packing element received in the recess, a vertically disposed tubular casing having its lower end threadedly engaged with the threads of the recess and having an inwardly directed annular flange formed on its upper end, a transparent tube received within the casing and having its lower end closed and resting upon the packing element and its upper end abutting the annular flange, a pressure responsive liquid in the transparent tube, and a pressure conducting pipe arranged concentrically in the transparent tube and having its upper end projecting from the upper end of the casing.

CHARLES W. CAREY.